(12) United States Patent
Bossard

(10) Patent No.: US 7,785,562 B1
(45) Date of Patent: Aug. 31, 2010

(54) SYSTEM AND METHOD FOR SEPARATING HYDROGEN GAS FROM A HYDROCARBON USING A HYDROGEN SEPARATOR ASSISTED BY A STEAM SWEEP

(76) Inventor: Peter R. Bossard, 106 Railroad Dr., Ivyland, PA (US) 18974

( * ) Notice: Subject to any disclaimer, the term of this patent is extended or adjusted under 35 U.S.C. 154(b) by 285 days.

(21) Appl. No.: 11/879,235

(22) Filed: Jul. 18, 2007

(51) Int. Cl.
*C01B 3/26* (2006.01)
*C01B 3/02* (2006.01)
*C01B 3/24* (2006.01)

(52) U.S. Cl. .................... 423/652; 423/648.1; 423/650; 423/651

(58) Field of Classification Search .............. 423/648.1, 423/650–656
See application file for complete search history.

(56) References Cited

U.S. PATENT DOCUMENTS

| | | | | |
|---|---|---|---|---|
| 5,525,322 | A * | 6/1996 | Willms | 423/653 |
| 5,614,001 | A | 3/1997 | Kosaka et al. | 96/10 |
| 5,997,594 | A * | 12/1999 | Edlund et al. | 48/76 |
| 6,165,633 | A * | 12/2000 | Negishi | 429/17 |
| 6,783,741 | B2 * | 8/2004 | Edlund et al. | 422/191 |
| 6,783,750 | B2 * | 8/2004 | Shah et al. | 423/652 |
| 7,041,272 | B2 * | 5/2006 | Keefer et al. | 423/651 |

* cited by examiner

*Primary Examiner*—Karl E Group
*Assistant Examiner*—Noah S Wiese
(74) *Attorney, Agent, or Firm*—LaMorte & Associates

(57) ABSTRACT

A power generation system and a fuel processor for use therein. The system produces steam from a water supply. A highly heated reaction chamber is provided. A common hydrocarbon fuel is mixed with water and introduced into the heated reaction chamber. The hydrocarbon fuel and water react at pressure and temperature, producing less complex gases. The resultant gases are passed into a hydrogen separator that is directly swept with steam. The hydrogen separator separates hydrogen from the resultant gases. The separated hydrogen is carried away from the hydrogen separator by the steam, thereby making the hydrogen separator more efficient. The hydrogen is separated from the steam is used to power a fuel cell. The fuel cell produces electricity and water is recycled back into the system.

9 Claims, 4 Drawing Sheets

SYSTEM AND METHOD FOR SEPARATING HYDROGEN GAS FROM A HYDROCARBON USING A HYDROGEN SEPARATOR ASSISTED BY A STEAM SWEEP

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas and utilize the hydrogen as fuel for a fuel cell.

2. Prior Art Description

In industry, there are many applications for the use of ultra pure molecular hydrogen. For instance, there are many fuel cells that operate using hydrogen. The hydrogen, however, must be ultra pure. Any molecules of carbon dioxide, carbon monoxide or other contaminant gases that are received by the fuel cell cause damage to the fuel cell and decrease both the efficiency and the functional life of the fuel cell.

Commonly, purified hydrogen for use by a fuel cell is generated using a two stage process. In the first stage, hydrogen gas is separated from a source gas. For example, hydrogen can be separated from a hydrocarbon gas. However, in many common processes that produce hydrogen, the hydrogen gas produced is not pure. Rather, when hydrogen is produced, the resultant gas is often contaminated with hydrocarbons and/or other contaminants. It is for this reason that a second processing stage is used.

In the second processing stage, the separated hydrogen gas is then purified to remove lingering contaminants. In the art, ultra pure hydrogen is commonly considered to be hydrogen having purity levels of at least 99.9999%. In the prior art, one of the most common ways to purify contaminated hydrogen gas is to pass the gas through a conduit made of a hydrogen permeable material, such as palladium or a palladium alloy. As the contaminated hydrogen gas passes through the conduit, atomic hydrogen permeates through the walls of the conduit, thereby separating from the contaminants. In such prior art processes, the conduit is kept internally pressurized and is typically heated to at least three hundred degrees centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

In the past, fuel cells have mostly been used to power exotic devices, such as spacecraft. Accordingly, the cost of operating a two stage system for obtaining purified hydrogen is of little concern. However, if fuel cells are to be used to power more traditional devices, such as automobiles, a two stage process for obtaining purified hydrogen is highly problematic. Consider an automobile. Using a two stage system, hydrogen gas would be separated from a source gas at some processing plant. The hydrogen gas would then be shipped under pressure to gas stations for storage. The high pressure hydrogen gas would then have to be pumped into the automobile for use by a fuel cell. This fueling scenario requires pressurized tanks to be maintained both at the gas station and within the automobile. It also requires pumping lines and couplings for fueling the automobile that can hold hydrogen gas under immense pressure. The dangers and cost of refueling alone have long been deterrents to producing any vehicle that runs on hydrogen.

A long-standing need, therefore, exists for a single stage fuel processing system, wherein a traditional fuel, such as diesel, gasoline, can be pumped into the gas tank of an automobile or a ship in the ordinary manner. A fuel processing system carried within the automobile or ship will then obtain ultra pure hydrogen from traditional fuel in a single stage process that operates on an as-needed basis. The ultra pure hydrogen can then be used to power a fuel cell for the energy efficient production of electrical power.

This need is met by the present invention as described and claimed below.

SUMMARY OF THE INVENTION

The present invention is a power generation system and a micro-channel fuel processor for use within a power generation system. A highly heated reaction chamber is provided. A common hydrocarbon fuel is mixed with water and is introduced into the heated reaction chamber. The hydrocarbon fuel and water react, producing less complex resultant gases. The resultant gases are passed into a micro-channel hydrogen separator that is directly swept with a flow of steam. The hydrogen separator separates hydrogen from the resultant gases. The separated hydrogen is carried away from the hydrogen separator by the steam, thereby making the hydrogen separator more efficient. The hydrogen is separated from the steam and is used to power a fuel cell. The fuel cell produces electricity and water that can be recycled back into the system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention fuel processing system provides a highly efficient means for converting a hydrocarbon fuel, at ambient pressure, directly into ultra-pure hydrogen. The ultra-pure hydrogen is then used to power a fuel cell for the production of electricity.

Figure 1:
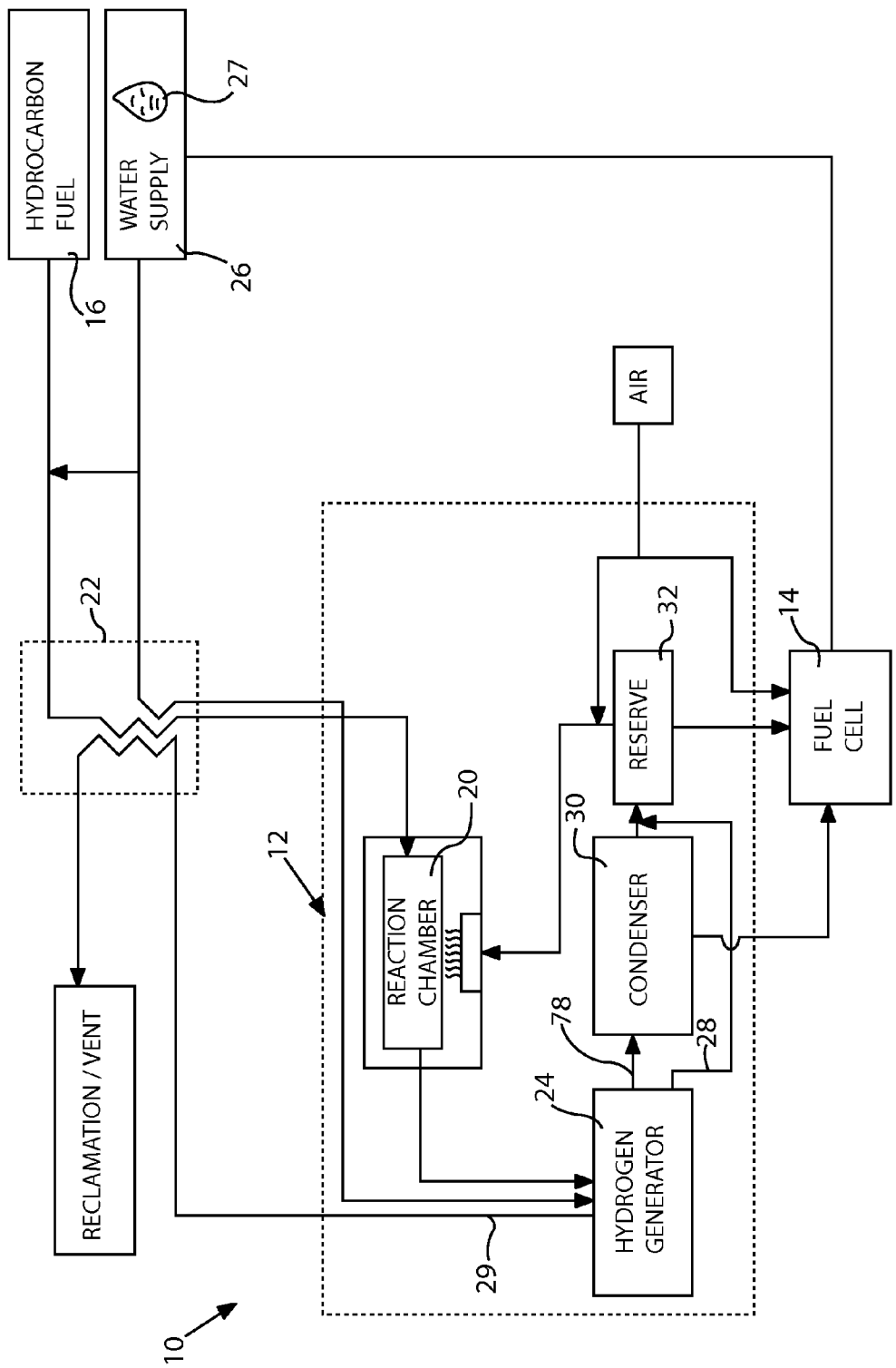
FIG. 1 is a schematic of an exemplary embodiment of a power generating system containing a fuel processor in accordance with the present invention.

Referring to FIG. 1, there is shown a schematic of an exemplary embodiment of a power generation system 10 that contains a fuel processor 12 and a fuel cell 14. The fuel processor 12 converts a hydrocarbon fuel 16 into ultra-pure hydrogen that is then used to run the fuel cell 14.

The fuel cell 14 receives ultra-pure hydrogen from the fuel processor 12 and produces electricity. There are several prior art fuel cell designs that require ultra-pure hydrogen for proper operation. Any such fuel cell can be adapted for used as part of the overall power generation system 10.

The fuel processor 12 includes a reaction chamber 20, a heat exchanger 22 and a hydrogen generator 24. A traditional hydrocarbon fuel 16 is provided to the fuel processor 12. The hydrocarbon fuel 16 can be either in liquid or gas form. The hydrocarbon fuel 16 contains some type of primary hydrocarbon that is mixed with water and then vaporized. The hydrocarbon contained within the hydrocarbon fuel 16 is represented by the formulation C(n)H(m) where (n) is the number of carbon atoms in the hydrocarbon and (m) is the number of hydrogen atoms in the hydrocarbon. Appropriate fuels would include, but are not limited to, diesel fuel, gasoline, kerosene, natural gas, propane and alcohols.

A water supply 26 is provided. The water supply 26 has a split feed. Some water 27 from the water supply 26 is mixed with the hydrocarbon fuel 16 in precalculated amounts governed by Equation 1 provided below. Some of the water 27 from the water supply 26 is fed through the heat exchanger 22 that converts the water 27 to steam. The heat exchanger 22 can therefore be considered a steam generator that is disposed along the water line. The water 27 in the water supply 26 is replenished by the power generation system 10 as will later be explained.

If the hydrocarbon fuel 16 selected is a liquid, the hydrocarbon fuel 16 and water 27 are mixed as liquids. The fuel/water combination passes through the heat exchanger 22, therein both the hydrocarbon fuel 16 and the water 27 are converted into vapor. The vaporized hydrocarbon fuel 16 and steam are fed into a heated reaction chamber 20. The hydrocarbon fuel 16 and steam are received in controlled amounts. The reaction chamber 20 is maintained at a temperature between 550° C. and 800° C. depending of the particular fuel. At these temperatures, any complex hydrocarbons present in the hydrocarbon fuel 16 break apart into simpler molecules. The gas composition due to the mass balance is shown in Equation 1 below when the reaction is fully converted to carbon dioxide and hydrogen.

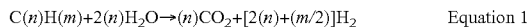  Equation 1

Using real numbers, assume the primary hydrocarbon in the hydrocarbon fuel 16 is $C_8H_{18}$, such as the case with diesel fuel. Using Equation 1, the following reaction occurs.

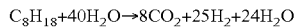

It can therefore be seen that by combining the hydrocarbon fuel 16 with steam in the reaction chamber 20, a hydrocarbon containing only eighteen hydrogen atoms (H) results in reactant gases that include 25 free molecules of hydrogen gas ($H_2$). As shown in Equation 1, the water to carbon ration is 4 or more waters for each carbon atom in the hydrocarbon or alcohol to prevent coke (carbon deposits) from forming. In Equation 1 we have used 5 water molecules for each carbon atom in the hydrocarbon chain.

The reaction chamber 20 is coupled to a hydrogen generator 24. An exemplary structure for the hydrogen generator 24 is later described.

The hydrogen generator 24 receives the reactant gases from the reaction chamber 20. The reactant gases are the gases on the right hand side of Equation 1. The hydrogen generator 24 separates the hydrogen from the reactant gases. The hydrogen generator 24 has three outputs. One output 28 is for the purified hydrogen gas. A second output 78 is for purified hydrogen gas mixed with steam. A third output 29 is for raffinate gases.

The hydrogen gas and steam that exit the second output 78 are fed into a condenser 30. The steam condenses in the condenser 30, therein enabling the purified hydrogen gas to separate from the steam after the steam condenses to water. The water from the condensed steam is recycled and the latent heat of vaporization is transferred to the incoming fuel and water and mix and sweep water. The most of the purified hydrogen gas containing a small amount of water vapor after the water condenser is fed to the fuel cell 14.

The raffinate gas output 29 of the hydrogen generator 24 primarily passes $CO_2$ and steam. Gases exiting through the raffinate gas output 29 are hot but below the boiling point of water at the pressure and temperature of the raffinate gas stream. The raffinate gas output 29 is therefore fed into the heat exchanger 22 so that some of the heat in the exiting gases can be utilized to heat the incoming fuel and water mix and the other gas be feed into the fuel processor.

The ultra-pure hydrogen from the hydrogen generator 24 is fed to the fuel cell 14. The fuel cell 14 receives the ultra-pure hydrogen and oxygen from ambient air. The fuel cell 14 converts the ultra-pure hydrogen and air into electricity and water ($H_2O$). Depending upon the type of fuel being used, the volume of water created by the fuel cell 14 when add to the water recovered from the raffinate and the water recovered from the steam sweep can exceed the volume of water 27 that is fed into the reaction chamber 20. Thus, the water produced by the fuel cell 14 can be used to replenish the water supply 26 and still excess clean water exists for use in other purposes.

The reaction chamber 20 can be heated in many ways. For instance, electrical power from the fuel cell 14 can be used to heat the reaction chamber 20. However, one of the most efficient ways to heat the reaction chamber 20 is to burn some of the purified hydrogen produced by the hydrogen generator 24. The purified hydrogen flowing out of the reaction chamber 20 to the fuel cell 14 can be tapped. A small percentage of that hydrogen gas can be mixed with air to heat the reaction chamber 20. A reactant 31, such as palladium, can be present in the reaction chamber 20 to start a rapid oxidation reaction between the hydrogen and the air. As the hydrogen burns, it rapidly heats the reaction chamber 20 to its operational temperature.

A small supply reserve 32 of ultra-pure hydrogen can be optionally maintained so that there is enough hydrogen gas present to initially heat the reaction chamber 20 upon start up.

The combustion of the hydrogen gas in the steam generator 22 with air results in water vapor and nitrogen (N2) rich air mixture because $O_2$ has been removed during the combustion of hydrogen. The water vapor can be recovered and recycled to the water supply 26. The trace gases can be vented to the surrounding atmosphere.

Figure 2:
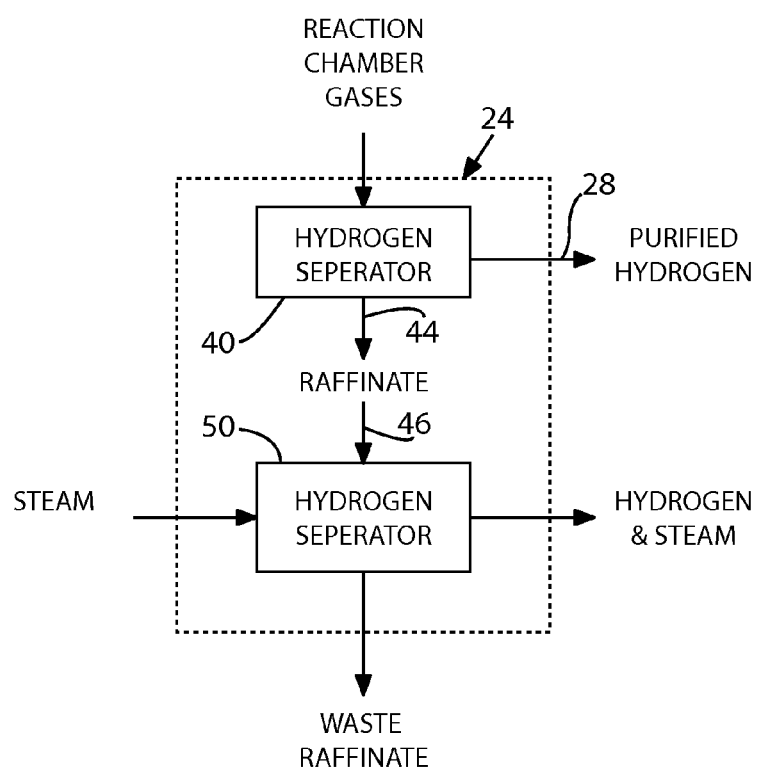
FIG. 2 is a schematic of a hydrogen generator used within the power generating system.

In FIG. 2, a schematic of an exemplary hydrogen generator 24 is shown. Referring to FIG. 2 in conjunction with FIG. 1, it can be seen that the hydrogen generator 24 receives the mixed gases from the reaction chamber 20. The mixed gases are the gases represented on the right side of Equation 1. Within the hydrogen generator 24, the mixed gases are fed into a traditional hydrogen separator 40. There are many hydrogen separators that exist in the prior art that separate hydrogen gas from a mixed gas by exposing the mixed gas to a hydrogen permeable membrane. Any such prior art hydrogen separator can be used. However, it is preferred that a highly efficient micro-channel hydrogen separator be used. Highly efficient hydrogen separators are the subjects of the following co-pending patent applications by the present applicant: U.S. patent application Ser. No. 11/522,004, entitled System And Method For Separating Hydrogen Gas From A Mixed Gas Source Using Composite Structure Tubes, filed Sep. 18, 2006; U.S. patent application Ser. No. 11/341,541, entitled System And Method For Processing Fuel For Use By A Fuel Cell Using A Micro-channel Catalytic Hydrogen Separator, filed Jan. 27, 2006; U.S. patent application Ser. No. 11/522,004, entitled System And Method For Separating Hydrogen Gas From A Mixed Gas Source Using Composite Structure Tubes, filed Sep. 18, 2006; and U.S. patent application Ser. No. 11/515,976, entitled Composite Structure For High Efficiency Hydrogen Separation Containing Preformed Nano-particles In A Bonded Layer, filed Sep. 3, 2006. The disclosures of all of these applications are incorporated into this specification by reference.

The traditional hydrogen separator 40 separates most of the hydrogen gas from the mixed gas. As is indicated by output 28 in FIG. 1, the purified hydrogen gas is fed to the fuel cell 14, through the reserve 32. However, the raffinate output 44 of the traditional hydrogen separator 40 is fed into the input 46 of a steam swept hydrogen separator 50.

The steam swept hydrogen separator 50 essentially uses a traditional hydrogen separator unit. However, purified hydrogen is actively swept out of the hydrogen separator by a flow of steam. As has been previously mentioned, a hydrogen separator contains a hydrogen permeable membrane. The hydrogen permeable membrane has a first side that is exposed to the mixed gas and a second side that is exposed only to the purified hydrogen. Hydrogen gas from the mixed gas disassociates and passes through the hydrogen permeable membrane as atomic hydrogen. Once through the hydrogen permeable membrane the atomic hydrogen reassociates into molecular hydrogen. The efficiency by which hydrogen passes through a hydrogen permeable membrane depends upon many factors. One of these factors is the concentration of hydrogen molecules on the purified side of the membrane. By providing a flow of steam across the purified side of the hydrogen permeable membrane, hydrogen molecules are swept away. The decrease in hydrogen molecules on the purified side allows for the more efficient permeation of hydrogen from the mixed gas side. The result is a highly efficient transfer of hydrogen from the mixed gas through the hydrogen permeable membrane.

Figure 3:
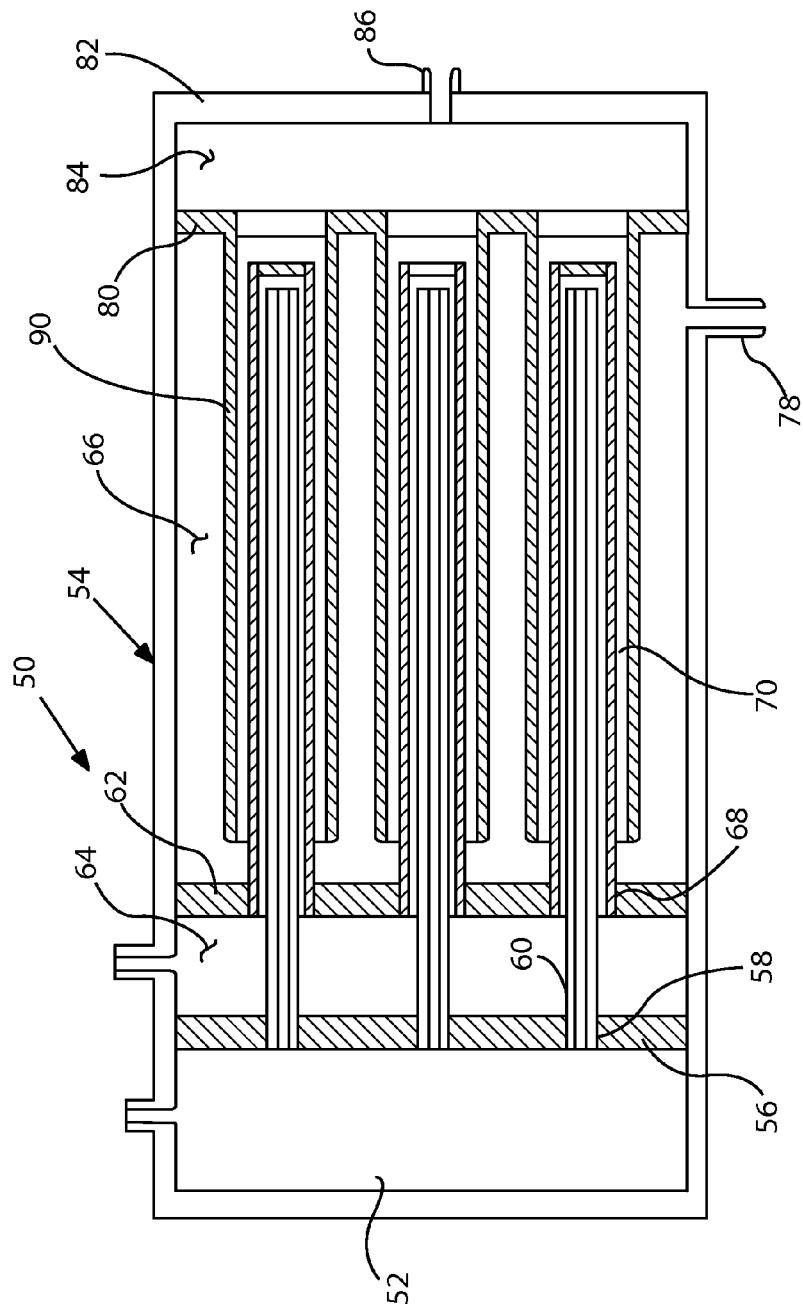
FIG. 3 is a cross-sectional view of an exemplary hydrogen separator that can be used within the hydrogen generator.

Referring to FIG. 3, an exemplary structure of the steam swept hydrogen separator 50 is shown. The steam swept hydrogen separator 50 has an enclosed housing 54. A plenum chamber 52 is disposed at one end of the enclosed housing 54. The enclosed housing 54 is preferably made of stainless steel or another high strength alloy that is non-reactive to any of the component gases received from the reaction chamber.

The plenum chamber 52 is defined between the interior of the enclosed housing 54 and a first chamber wall 56. The first chamber wall 56 contains a plurality of holes 58 that are symmetrically arranged in a highly space efficient manner. The holes 58 are preferably spaced as densely as possible while still maintaining a predetermined minimum area of material around each of the holes 58.

A plurality of support tubes 60 extend from the first chamber wall 56. The support tubes 60 have solid walls with opposing open ends. The support tubes 60 are joined to the first chamber wall 56 at each of the holes 58. In this manner, the holes 58 directly communicate with the interior of the support tubes 60 and any gas flowing out of the plenum chamber 52 through the first chamber wall 56 must flow through the support tubes 60.

Although the exemplary embodiment shows only three support tubes 60 that communicate with the plenum chamber 52, it will be understood that hundreds may be present. The use of three is for simplicity of illustration.

The support tubes 60 have a length nearly as long as the interior of the enclosed housing 54. The support tubes 60 and the first chamber wall 56 are preferably made of the same non-reactive material as is the enclosed housing 54. In this manner, the first chamber wall 56, and the support tubes 60 have the same coefficient of thermal expansion as does the enclosed housing 54.

A second chamber wall 62 is disposed within the enclosed housing 54 at a point adjacent the first chamber wall 56. The second chamber wall 62 creates two additional chambers within the enclosed housing 54 in addition to the plenum chamber 52. A raffinate gas collection chamber 64 is created between the first chamber wall 56 and the second chamber wall 62. Furthermore, a steam swept hydrogen collection chamber 66 is created between the second chamber wall 62 and a third chamber wall. A collection port 78 communicates with the steam swept hydrogen collection chamber 66 so that gases can be drawn out of the steam swept hydrogen collection chamber 66.

The second chamber wall 62 defines a plurality of holes 68 that are slightly larger than the diameter of the support tubes 60 that are extending from the first chamber wall 56. The holes 68 in the second chamber wall 62 are aligned with the support tubes 60, thereby allowing the support tubes 60 to extend through the second chamber wall 62.

A plurality of hydrogen permeable tubes 70 are coupled to the second chamber wall 62. The hydrogen permeable tubes 70 are aligned with the holes 68 in the second chamber wall 62 and pass around the support tubes 60. It will therefore be understood that the hydrogen permeable tubes 70 are coaxially aligned with the support tubes 60 and surround the support tubes 60. The hydrogen permeable tubes 70 are preferably palladium or a palladium based alloy, such as a palladium/silver alloy. However, other hydrogen permeable alloys can also be used.

The third chamber wall 80 is disposed near the distal end wall 82 of the enclosed housing 54. The third chamber wall 80 creates a steam supply chamber 84 between the third chamber wall 80 and the distal end wall 82. Steam is supplied to the steam supply chamber 84 through a steam inlet port 86 that receives steam from the heat exchanger 25 (FIG. 1). A plurality of steam supply tubes 90 extends from the third chamber wall 80 into the steam swept hydrogen collection chamber 66. The steam supply tubes 90 communicate with the steam supply chamber 84. As such, it will be understood that any steam that is fed into the steam supply chamber 84 will flow out of the steam supply chamber 84 through the steam supply tubes 90.

The steam supply tubes 90 are all coaxially aligned with the hydrogen permeable tubes 70 in the steam swept hydrogen collection chamber 66. The steam supply tubes 90 have an internal diameter that is larger than the external diameter of the hydrogen permeable tubes 70. Accordingly, the hydrogen permeable tubes 70 can pass inside the steam supply tubes 90 and only a small gap separates the interior of the steam supply tubes 90 with the exterior of the hydrogen permeable tubes 70.

Figure 4:
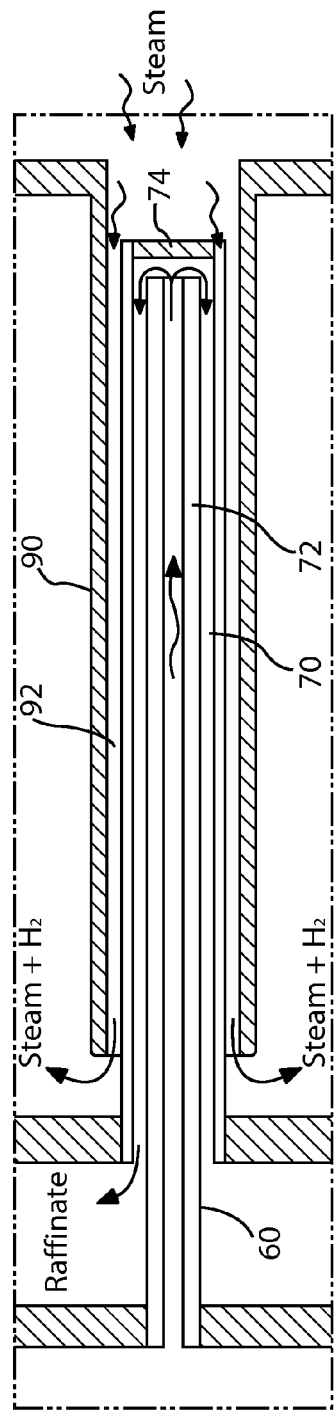
FIG. 4 is an enlarged view of a section of a portion of the hydrogen separator shown in FIG. 3.

Referring to FIG. 4, it can be seen that a first gap space 72 exists between the outside surface of the support tubes 60 and the inside surface of the hydrogen permeable tubes 70. The size of the first gap space 72 is dependent upon the thickness of the walls of the hydrogen permeable tubes 70. Preferably, the size of the gap space 72 is between two times (2×) and fifty times (50×) the thickness of the wall that forms the hydrogen permeable tubes 70. The first gap space 72 runs along the length of the support tubes 60 in the area where the hydrogen permeable tubes 70 overlap the support tubes 60.

The hydrogen permeable tubes 70 are longer than the support tubes 60 they surround. The free ends of the hydrogen permeable tubes 70 are closed. In the shown embodiment, an internal end cap 74 is internally brazed in place at the end of each of the hydrogen permeable tubes 70. The end caps 74 are preferably brazed to the inside of the hydrogen permeable tubes 70. In this manner, the end caps 74 do not restrict the hydrogen permeable tubes 70 from expanding outwardly when heated and saturated with molecular hydrogen.

The steam supply tubes 90 surround the hydrogen permeable tubes 70. Accordingly, a second gap space 92 exists between the exterior of each hydrogen permeable tube 70 and the interior of each steam supply tube 90. The second gap space 92 is at least as large as the first gap space 72 and can be as 0.5 millimeters.

Referring to FIG. 3 and FIG. 4, it will be understood that in operation, the enclosed housing 54 and all its contents are heated to an operating temperature in excess of 300 degrees Centigrade by the incoming gases from the reaction chamber.

The gases from the reaction chamber are introduced into the plenum chamber 52. The gases fill the plenum chamber 52 and flow into the support tubes 60 through the first chamber wall 56. The gases exit the far ends of the support tubes 60 and are forced to flow through the gap spaces 72 that exist between the exterior of the support tubes 60 and the interior of the surrounding hydrogen permeable tubes 70. The gap spaces 72 drain into the raffinate gas collection chamber 64. However, as the gases flow through the gap spaces 72, the flowing gases spread thinly over the outside surfaces of the hydrogen permeable tubes 70. The length and width of the gap spaces 72, as well as the gas flow rate, are engineered to maximize the efficiency at which the hydrogen gas permeates through the hydrogen permeable tubes 70. By spreading the contaminated gas thinly over the surfaces of the hydrogen permeable tubes 70, the hydrogen contained within the reaction chamber gases does not have to diffuse far before it contacts hydrogen permeable material. In this manner, a high percentage of the hydrogen available in the reaction chamber gases are provided with the opportunity to disassociate from the reaction chamber gases and pass through the hydrogen permeable tubes 70.

As hydrogen gas passes through the hydrogen permeable tubes 70, the hydrogen gas enters into the second gap space 92 that exists between the hydrogen permeable tubes 70 and the steam supply tubes 90. Steam is fed into the steam supply chamber 84. The steam flows out of the steam supply chamber 84 through the steam supply tubes 90. Accordingly, the steam is forced to flow through the second gap space 92 that exists between the hydrogen permeable tubes 70 and the steam supply tubes 90. As the steam flows through the second gap spaces 92, the steam sweeps hydrogen gas out of the second gap spaces 92. The combined steam and hydrogen gas then leave the steam swept hydrogen collection chamber 66 through the outlet 78. The combined hydrogen gars and steam is then fed to the condenser 30 (FIG. 1) for separation. After separation, the hydrogen gas is pure, being contaminated only with water vapor. Such an output is ideal for use by a proton exchange membrane fuel cell.

As the hydrogen gas is swept away from the exterior of the hydrogen permeable tubes 70, the partial pressure of hydrogen outside the hydrogen permeable tubes decreases. This increases the efficiency at which hydrogen gas passes through the hydrogen permeable tubes 70.

The non-hydrogen components of the reaction chamber gases flow through the gap spaces 72 and into the raffinate gas collection chamber 64. The raffinate gas is then drawn out and vented.

Since the gases from the reaction chamber pass through the plenum chamber 52 and the gap spaces 72 within the steam swept hydrogen separator 50, it should be understood that catalytic material can be placed in these areas. The catalytic material can be used to further crack lingering hydrocarbons, there by releasing more hydrogen gas.

In the embodiment of the hydrogen generator 24 illustrated in FIG. 2, the hydrogen generator 24 contains two hydrogen separators 40, 50. The first hydrogen separator 40 is traditional, the second is steam swept. It should be understood that the use of the first traditional hydrogen separator 40 is exemplary. The invention works well with just a single steam swept hydrogen separator. Likewise, two or more steam swept hydrogen separators can be used in series.

It will further be understood that the illustrated embodiment of the overall fuel processor is merely exemplary and that a person skilled in the art can make many changes using functionally equivalent configurations. For example, the reaction chamber and the combustion compartment that heats the reaction chamber can have numerous configurations. Furthermore, the structure of the heat exchanger and the fuel cell are a matter of design selection. It will be further understood that an embodiment of the present invention can be made where a plurality of fuel processors and/or fuel cells are used together. All such variations, modifications and alternate embodiments are intended to be included within the present invention as defined by the claims.

What is claimed is:

1. A method of producing hydrogen gas, comprising the steps of:
   providing a hydrocarbon fuel;
   providing water;
   mixing said hydrocarbon fuel with some of said water and heating both until said hydrocarbon fuel and said water react to produce reactant gases;
   removing some hydrogen gas from said reactant gases, therein producing raffinate gases;
   providing a hydrogen separator containing a hydrogen permeable surface with a first side and a second side;
   producing steam from said water;
   exposing said first side of said hydrogen permeable surface to said raffinate gases, wherein hydrogen from said reactant gases passes through said hydrogen permeable surface to said second side; and
   flowing some of said steam across said second side, therein sweeping hydrogen away from said hydrogen permeable surface.

2. The method according to claim 1, further including the step of separating hydrogen gas swept away with steam from said steam by condensing said steam.

3. A method of generating power, comprising the steps of:
   providing a fuel cell that operates using hydrogen gas;
   providing a hydrocarbon fuel;
   providing water;
   reacting said hydrocarbon fuel with some of said water in a heated environment to produce reactant gases;
   removing some hydrogen gas from said reactant gases, therein producing raffinate gases;
   producing steam with some of said water;
   providing a hydrogen separator;
   passing said raffinate gases through said hydrogen separator to obtain hydrogen gas;
   sweeping said hydrogen gas from said hydrogen separator with some of said steam; and
   supplying said hydrogen gas to said fuel cell, wherein said fuel cell produces power.

4. The method according to claim 3, wherein said fuel cell generates water when producing said power, and wherein said water is recycled for use in reacting with said hydrocarbon fuel.

5. The method according to claim 3, further including the step of removing water from said reactant gases.

6. The method according to claim 3, further including heating said heated environment by burning some of said hydrogen gas.

7. The method according to claim 3, further including producing said steam by passing some of said water through a heat exchanger.

8. The method according to claim 3, further including the step of heating said heated environment to a temperature in excess of 550° C.

9. The method according to claim 3, wherein said step of providing a hydrocarbon fuel includes providing a hydrocarbon fuel selected from a group consisting of diesel fuel, gasoline, kerosene, propane, natural gas and alcohols.

* * * * *